United States Patent

[11] 3,611,144

[72] Inventors Samuel T. Harmon, Jr.;
James R. Ackley; Kenneth E. Monroe, all of Ann Arbor, Mich.

[21] Appl. No. 803,788
[22] Filed Mar. 3, 1969
[45] Patented Oct. 5, 1971
[73] Assignee Datamax Corporation
Ann Arbor, Mich.

[54] SIGNAL TRANSMISSION SYSTEM WITH COHERENT DETECTION AND DISTORTION CORRECTION
4 Claims, 2 Drawing Figs.

[52] U.S. Cl. .................... 325/50, 325/330, 325/342, 325/421, 329/50
[51] Int. Cl. .................... H04b 1/68, H04b 1/30, H03d 1/22
[50] Field of Search .................... 325/49, 50, 329, 330, 342, 418, 419, 420, 421; 329/50

[56] References Cited

UNITED STATES PATENTS

| | | | |
|---|---|---|---|
| 2,961,533 | 11/1960 | Martin | 325/419 |
| 3,160,815 | 12/1964 | Ford et al. | 325/420 |
| 3,358,234 | 12/1967 | Stover | 325/49 |
| 3,391,341 | 7/1968 | Eddy | 325/49 |
| 3,493,876 | 2/1970 | Zimmerman | 329/50 |

OTHER REFERENCES

Norgaard, " Practical Single-Sideband Reception," QST, July, 1948, pgs. 11- 15.[ 325- 329–copy made in group 230]

*Primary Examiner*—Robert L. Griffin
*Assistant Examiner*—James A. Brodsky
*Attorney*—Hauke, Krass, Gifford and Patalidis ABSTRACT: Digital or analog data to be transmitted is employed to amplitude modulate a carrier to generate a single-side-band signal which is provided to a receiver over a communication channel. At the receiver a signal having the frequency of the carrier component of the received signal and a constant phase with respect to the carrier component is derived by multiplying the incoming signal by both the output of a local oscillator and the oscillator output phase shifted by 90° and then comparing the two products to derive a feedback signal for adjusting the phase of the local oscillator. The oscillator output and the 90°-shifted oscillator signal are each phase shifted by 45° and separately multiplied by the received signal and the output of the 90° multiplication is differentiated and summed with the other product to derive the original transmitted signal.

In an alternate embodiment of the invention a double-side-band signal is detected by a pair of product multipliers having inputs which respectively lead and lag the carrier component of the received signal by 45°. The output of the product multiplier which has the 45° leading input is then differentiated and summed in a weighted manner with the output of the other multiplier to derive the original transmitted signal.

INVENTORS
SAMUEL T. HARMON, JR.
JAMES R. ACKLEY
KENNETH E. MONROE

BY Haeske, Kraus, Gifford, & Patalidis
ATTORNEYS

INVENTORS
SAMUEL T. HARMON, JR
JAMES R. ACKLEY
KENNETH E. MONROE

BY Hauke, Krass, Gifford & Patalidis
ATTORNEYS

SIGNAL TRANSMISSION SYSTEM WITH COHERENT DETECTION AND DISTORTION CORRECTION

BACKGROUND OF THE INVENTION

1. Field of the Invention

This invention relates to electrical 3000 electronic system for transmitting digital and analog data over time-varying communication channels and more particularly to such systems wherein the receiver incorporates means for operating upon the received signal to eliminate distortion resulting from the transmission process.

2. Prior Art

Transmission channels for electrical signals such as telephone lines, cables and radio or microwave links act upon their input messages so as to provide the messages in modified forms at their outputs. These modifications result from such factors as operation of the electrical constants of the transmission medium on the received signal, limitations in the bandwidth of the channel, or introduction of noise along the transmission medium from such factors as atmospheric electrical disturbances, crosstalk, and the like. The modifications which these factors cause in the received signal may be broadly classified as time dispersion, nonlinearities and noise. Noise added in the transmission process may have many characteristics of the message so it must be dealt with at the receiver in a statistical manner as by filtering for an analog signal or error detection and correction for a digital signal. The problems of time or phase dispersion and nonlinearity are somewhat more deterministic and efforts to deal with them have centered about modifying the electrical properties of the line to offset its distortion tendencies. In one popular technique lumped constant electrical circuits termed "equalizers" are introduced at some point in the transmission medium in an effort to minimize these dispersal and nonlinearity effects. These networks may be preset or may be continuously adjustable in an adaptive manner dependent upon the characteristics of the received data signal or a continuous or periodic test signal. Alternatively, the receiver output may be filtered to compensate for the line introduced distortion and the filter characteristics varied either continuously, on a adaptive basis, or at selected intervals.

SUMMARY OF THE INV ENTION

The present invention contemplates a system which will operate upon the received signal to minimize the dispersal and nonlinearity effects of the transmission medium and additionally certain forms of noise introduced by the medium, on a continuous basis and in a more complete and reliable manner than lumped constant equalizers of postreceiver filters. Moreover, the apparatus used in the practice of the present invention is of a substantially lower order of cost and complexity than the previous equalizers and is useful with all forms of electrical communication and data input links and a wide variety of modulation techniques.

The broad concept of the present invention is to provide a system wherein the receiver derives a pair of wave forms from the output of the communication link by multiplying that output with a pair of internally generated signals which are orthogonal to one another and then operates on and combines the two wave forms in such a way as to cancel out the distorting components, leaving only the true signal.

The use of a pair of substantially orthogonal signals results in outputs from the two multipliers which have such a relationship to one another that their distorting components may be readily brought into substantial equality with one another.

The internally generated signals have a common frequency which is the same as that of the transmitter carrier and their phases will have a fixed relationship to that of the received carrier which is dependent upon the specific nature of the transmitted signal. In a subsequently disclosed embodiment of the invention wherein a single-side-band surpressed carrier signal is transmitted, one of the multiplying signals is in phase with the received signal and the other is 90° out of phase with respect to the first. These multiplying signals are generated by a phase-locked loop of novel design in the receiver. In another embodiment in which a double-side-band signal is transmitted the two multiplying signals respectively lead and lag the received carrier by 45°.

The manner in which the two orthogonally detected signals are operated upon and combined is dependent upon the nature of the transmitted signal, but the broad concept is to modify one or both of the signals until their form is such that when they are summed the line produced distortion terms cancel, leaving only data signal components. In the single-side-band case, which is subsequently described, the product of the detection process which employs a signal in phase with the received signal produces an output which may be mathematically expressed as a data signal component plus an assortment of higher order derivatives of the data signal itself and its Hilbert transform. The product of the detection process employing an input signal at 90° to the received signal produces only the Hilbert transform of the signal and higher order of derivatives of the signal and the transform. When this second signal is differentiated the result is a signal which contains only components which are equivalent to and opposite in sign from the distortion produced components of the first detection process. This differentiated signal is then summed with the output of the first detection process to cancel out the distortion components and leave only the desired data signal component.

In the double-side-band case detection with the two signals which respectively lead and lag the received carrier component by 45° produces a pair of signals each having a basic data signal components plus higher order derivatives of the data signal and its Hilbert transform.

The hardware of the receivers formed in accordance with the present invention is quite simple with the detectors being conventional product multipliers and the required filters and differentiators being of a relatively low order of complexity. The receivers operate on an adaptive basis in the sense that dynamic modifications of the response characteristics of the line results in dynamic modifications of the distortion cancellation process. The receivers are adaptable to a wide variety of lines and are capable of detecting data signals which are received with a relatively low signal-to-noise ratio.

Other objects, advantages and applications of the present invention will be made apparent by the following detailed description of the two preferred embodiments of the invention previously mentioned.

Both of the transmitter and receiver systems schematically shown are designed to transmit data over voice-grade telephone channels. The data may be either digital or analog in nature such as the output of a data-storing tape reader or the output of a facsimile machine.

Figure 1:
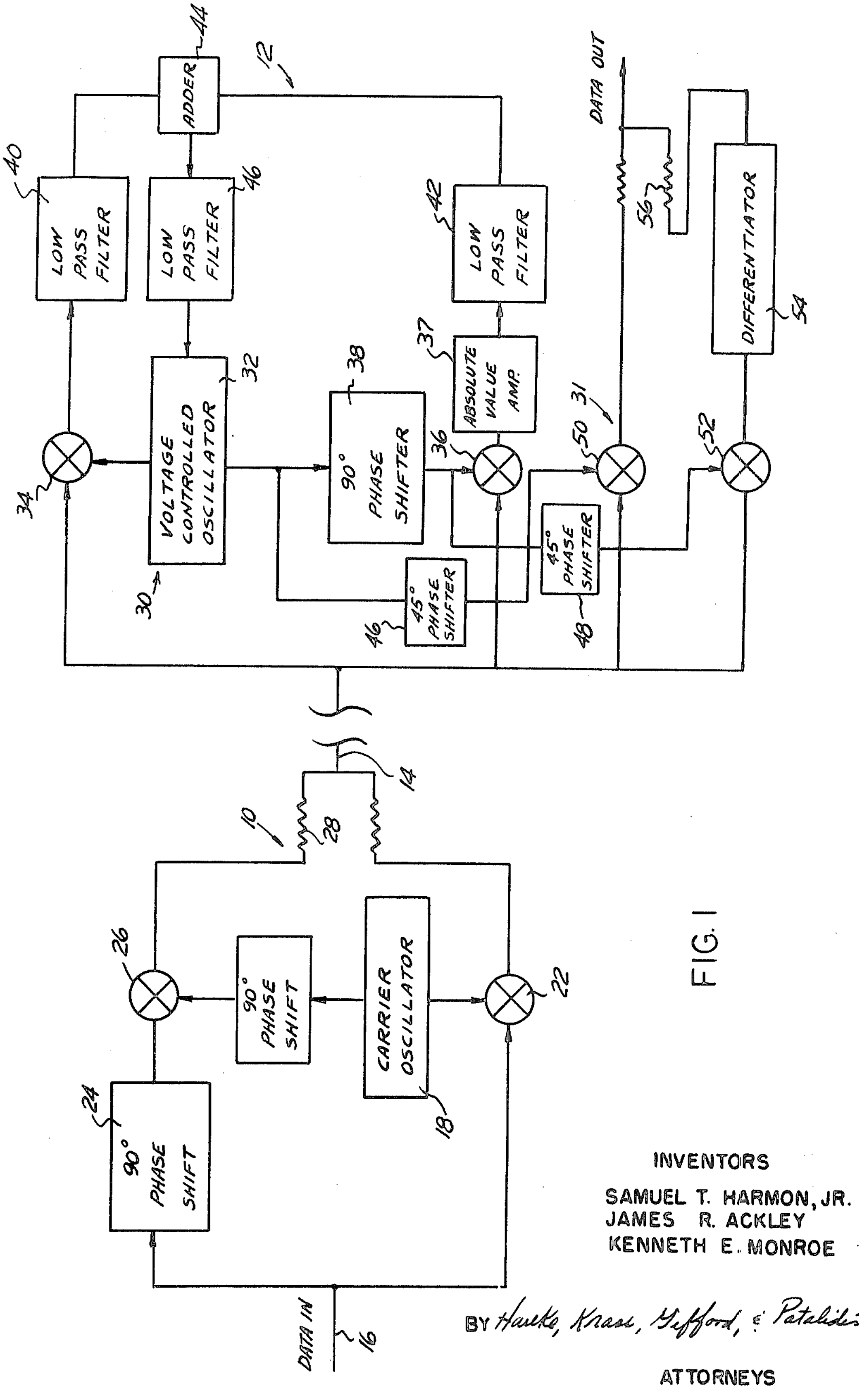
FIG. 1 is a block diagram of a single-side-band surpressed carrier transmitter providing a signal over a transmission line to receiver formed in accordance with the present invention for cancelling the distortion in the received signal.

Referring specifically to FIG. 1 there is illustrated a transmitter, generally indicated at 10, and a receiver, generally indicated at 12, the two being connected by a transmission line 14. The input data to the transmitter is provided on line 16 and in the preferred embodiment takes the form of the analog output of the scanner of a facsimile transmitter (not shown). The transmitter 10 is of conventional form and acts to modulate the output of an oscillator 18 with the input data from line 16 so as to produce a single-side-band, surpressed carrier signal. The telephone transmission line 14 may have a bandwidth extending from approximately 300 to 3000Hz. and the carrier frequency is preferably chosen at approximately 2800 Hz. The transmitter configuration is such as to cancel the upper side-band The input data from line 16 is provided directly to a first product multiplier 22 and through a 90° phase shift circuit 24 to a second product multiplier 26. The product multipliers or modulators employed at this end other points in both of the disclosed transmitters and receivers may be of any conventional construction which provide output signals having instantaneous amplitudes which are a product of the instantaneous amplitudes of their two input signals. In the preferred embodiment of the invention commercially available semiconductor product multipliers are employed but other forms such as ring modulators or exalted carrier-type detectors might be alternatively employed.

The second input to the multiplier 22 is from the carrier oscillator 18 so that the output of the multiplier constitutes a 2800 Hz. carrier modulated by the input data arriving on line 16 so as to include both upper- and lower-side-bands. The second input to the multiplier 26 is derived by passing the output of the carrier oscillator 18 through a 90° phase-shifter. This produces a modulated carrier at the output of the multiplier 26 in which both the carrier and the modulation enveloper are shifted by 90° with respect to the output of the product multiplier 22. These two modulated signals are summed in a resistor network 28 to provide the transmitter output to the transmission line 14. The summing process acts to cancel out the upper side-bands present in the two modulated signals and to cancel out the carrier component, leaving only a wave form representative of the lower side-band.

The receiver 12 may be considered as consisting of a section for generating synchronous reference signals for coherent detection, this section being generally indicated at 30, and a detecting and distortion correction section generally indicated at 31. The circuit 30 for deriving a synchronous carrier from the received single-side-band signal employs a novel form of phase-locked loop although more conventional forms could be employed. It centers around a voltage-controlled oscillator 32 which has a normal frequency substantially in line with the carrier frequency of the transmitter. The exact frequency and phase of the output of the oscillator 32 are governed by a control signal derived through use of a pair of product multipliers 34 and 36 each of which has the received signal as one of its inputs. The product multiplier 34 has the output of the voltage-controlled oscillator 32 as its other input while the product multiplier 36 has as its second input a signal derived by passing the output of the oscillator 32 through a 90° phase-shifter 38.

The outputs of the two product multipliers 34 and 36 thus represent two components of the received signal which are in quadrature with respect to one another. The output of the multiplier 36 is provided to an absolute value amplifier 37 operative to provide a positive output regardless of the sign of its input. Such device may simply constitute an amplifier and a full wave rectifier. It functions to eliminate what would otherwise be a 90° ambiguity in the loop's output. The products of the multiplier 34 and the output of the amplifier 37 are each low-pass filtered by units 40 and 42 respectively and are then added together in a summing network. This produces an output signal having a DC term proportional to the deviation in phase between the output of the oscillator 32 and the carrier of the received signal. This DC component is derived by passing the sum of the adder 44 through another low-pass filter 46. The output of the low-pass filter 46 is the control signal which is employed to adjust the phase of the voltage-controlled oscillator 32.

This feedback arrangement is such as to drive the phase of the voltage-controlled oscillator into a 45° phase relationship with a carrier of the incoming signal. The absolute value amplifier 37 insures that the input to the adder 44 from the low-pass filter 42 will always have a positive value. In order that the sum of the adder be zero it will be necessary that the low-pass filter 40 provide a negative output equal in amplitude to the output of the filter 42. This equal and opposite relationship between the outputs of the two multipliers occurs only when the phase of the voltage-controlled oscillator is at 45° with respect to the received carrier phase so that the multiplier 34 is provided with a 45 ° leading phase and the multiplier 36 with a 45° lagging phase. And deviation of the phase of the oscillator 32 from a 45° relationship with the phase of the incoming carrier will produce a DC signal from the low-pass filter 46 having such a sign as to bring the lcoal oscillator phase into that phase relationship.

The output of the voltage-controlled oscillator 32 is also passed through a phase shifter 46 which retards its phase by 45° and is then applied to a detector or product modulator 50 in the detection and correction circuit 31. The output of the product multiplier 50 would normally be the output of a coherent detection system since the detecting voltage applied is in phase with the carrier, but in addition to containing a component which is equivalent to the data input on line 16 this signal includes components which are expressible as higher order derivatives of the data signal and of its Hilbert transform. In order to remove these the received signal is detected in another product multiplier 52 with the output of a retarding 45° phase-shifter 48 which operates on the output of phase-shifter 38. Thus this detecting signal has a phase which laps that of the received carrier by 90°.

The product of this multiplication will not contain any pure data signal components since the detecting signal is orthogonal to the received carrier; rather, the output of the multiplier 52 will only have components which may be expressed as the Hilbert transform of the input data data signal and the higher order derivatives of both the data signal and its Hilbert transform. These components bear a substantial resemblance to the components which distort the data signal output of the product multiplier 50. In order to bring them into closer accord to these distortion components the output of the product multiplier 52 is differentiated in a conventional unit 54. The output of the differentiator 54 is summed with the output of the produce multiplier 50 in a resistor summing network 56. The output of the network 56 represents the compensated received signal. This signal has a much higher correlation with the input data on line 16 than does the raw output of the product multiplier 50.

In mathematical terms the output of the detector in a normal single-side-band receiver is conventionally represented as:

$$R=S-S'-S''+S'''+S''''=\ldots(1)$$

Where
R = Coherently detected output
S − Data Signal
S = Hilbert Transform of Data Signal Detection of the received signal with a signal that is orthogonal to the carrier components, as is done in product multiplier 52, will produce an output $$Q=S+S'-S'''-S''''+\ldots(2)$$

Where
Q = Orthogonaly detected output

Differentiating Q in unit 54 produces an output $$Q'=S'+S''-S'''-S''''\ldots(3)$$

On examination it will be noted that this signal is identical to those components of the coherently detected output R which mask the data signal component S. Summing signals R and Q' in network 56 cancels these distortion components producing an output substantially equal to S.

$$R+Q'S$$

In practice the cancellation will be imperfect because the various components of the received signal will have differing magnitudes so that operating upon certain of these components to cancel others will not result in a complete cancellation. However, the output of the receiver 56 will represent a substantial improvement over the raw output of the product multiplier 50.

Figure 2:
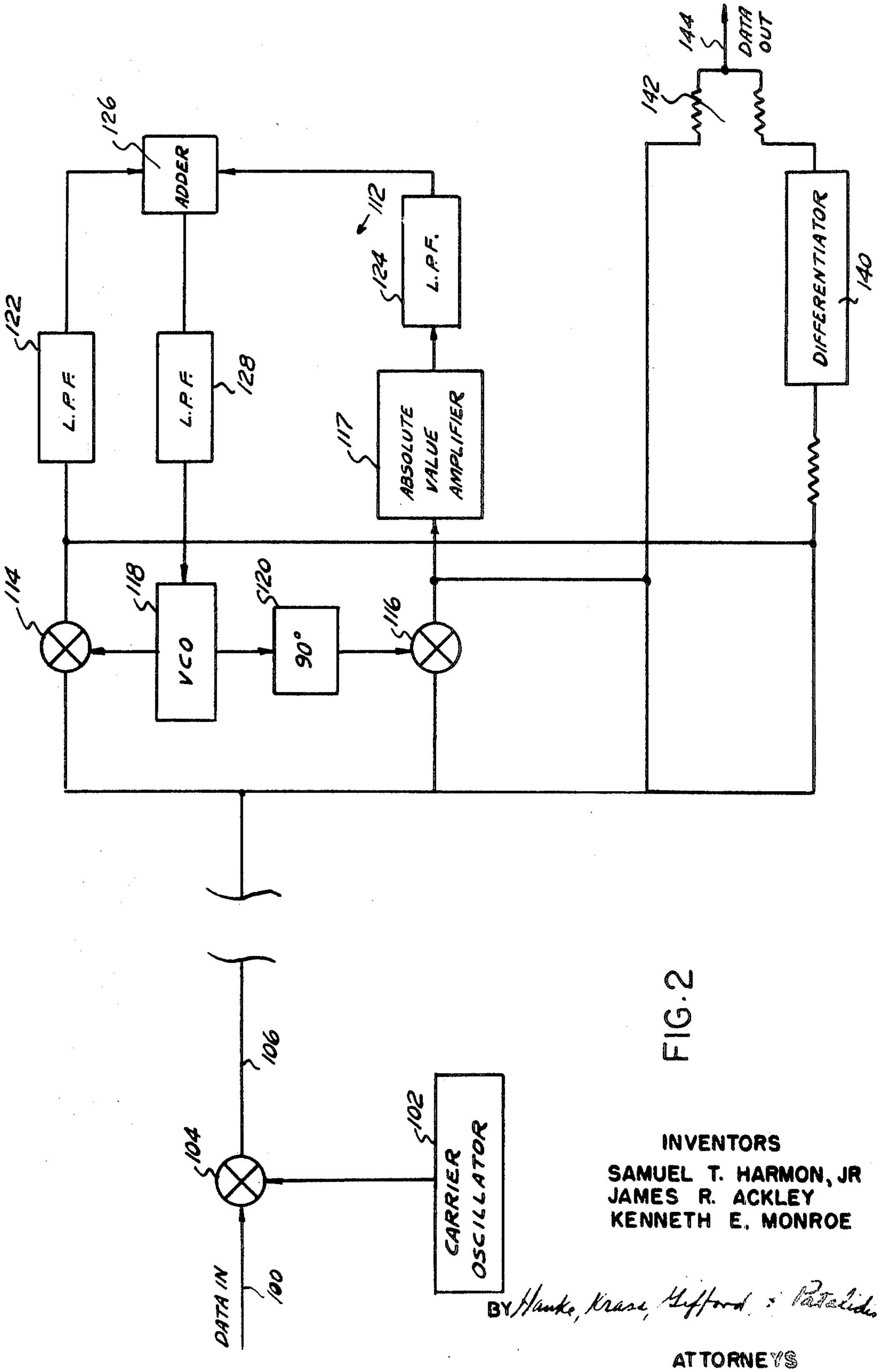
FIG. 2 is a schematic diagram of a transmission system employing a double-side-band transmitter and a receiver formed in accordance with the concept of the present invention.

A second embodiment of the invention, illustrated in FIG. 2, multiplies an incoming data signal on line 100 by a carrier generated by an oscillator 102 in a modulator 104 to generate a doubleiside-band signal which is applied to the transmission line 106.

The frequency of the oscillator 102 employed in this embodiment is approximately 2800 Hz. and the transmission line 106 is a voice-grade phone channel having a 300 Hz. to 3200 Hz. bandpass. Accordingly, the line acts to filter the transmitted signal to provide an output at the receiver 110 which broadly resembles a vestigial side-band signal.

The receiver 110 may, like the receiver of FIG. 1, be considered as consisting of a synchronous detecting signal generator, generally indicated at 112, and a compensating network, generally indicated at 114.

The generator of the synchronous signal for coherent detection 112 is identical to the equivalent unit 30 in the embodiment of FIG. 1. Again the received signal is detected by a pair of product multipliers 114 and 116 which receive the output of a voltage-controlled oscillator 118, and that output phase shifted by a 90° network 120, as their detecting inputs. The outputs of the two product multiplier 114 and the absolute value of the output of the multiplier 116, as provided by an amplifier 117 are separately passed through low-pass filters 122 and 124 and the outputs of these filters are summed by unit 126. The DC component of the product output of 126 is derived in a low-pass filter 128 to generate a control signal for the oscillator 118.

In this embodiment the outputs of the multipliers 114 and 116 are employed directly as the detecting outputs of the receiver. Since the detecting voltages used in these multipliers respectively lead and lag the carrier component of the received signal by 45°, the two detecting voltages are orthogonal to one another but they are not respectively in phase or orthogonal to the carrier component as was the case in the embodiment of FIG. 1. Employing the same symbolism as was used in the analysis of the embodiment of FIG. 1 detection of the received signal by a coherent signal shifted 45° with respect to the received signal's carrier, produces the vector sum of what would be the in-phase coherently detected signal R and the quadrature detected signal Q at the output of the multiplier 130. Similarly, detecting the received signal with a coherent signal which is lagging the received signal carrier by 45° produces the vector difference of R and Q. Each of these signals contains a component associated with the data signal as well as the Hilbert transform of the signal and higher order derivatives of both the signal and the transform.

The distortion cancellation process employed in this embodiment involves differentiating the output of the product multiplier 114 which has a 45° leading relationship with respect to the received carrier. The output of the differentiator 140 is again summed with the output of the product multiplier 130 in a resistor network 142 to produce the output data on line 144.

A comparison of the output of line 144 with the output of a product multiplier which accepts the received signal and a coherent signal in phase with the carrier component of the received signal, reveals that the compensation process produces a data output which has a substantially higher degree of identity with the data input signal than conventional detection.

The mathematical analysis of the operation of this embodiment is similar to that employed in connection with the embodiment of FIG. 1 but vector quantities must be employed. Again, the differentiation brings the components of the output of the 45° leading detector into substantial identity with the distorting components of the output of the 45° lagging detection process so that the two may be cancelled.

In practice the relative weights of the resistors forming the networks 56 and 42 must be adjusted in order to obtain an optimum distortion cancellation. Usually a single correction for a particular line is sufficient and this may be done by a suitable manual control at the initiation of a transmission or at the initial installation of the line.

While the disclosure of the preferred embodiments has referred to the use of detecting components which are at 90° to one another it should be recognized that similar, but not as satisfactory results may be obtained if the detecting voltages deviate somewhat from that ideal relationship.

The devices of FIGS. 1 and 2 are seen to be simple in construction and to act in an adaptive manner to compensate or cancel the distortion components normally associated with a conventional detection and data modulated signals.

Having thus described our invention, we claim:

1. A receiver for an electrical signal generated by modulating a carrier with a data signal, comprising: means supplying first and second detecting signals, one of said detecting signals being in phase with the carrier component of said received signal, a first product multiplier operative to accept as inputs the received signal and the first detecting signal having a frequency equal to that of said carrier and a fixed phase relationship with respect to the carrier component of the received signal; a second multiplier operative to accept as inputs the received signal and the second detecting signal having a substantially orthogonal relationship to said first detecting signal; and summing means connected with the two multipliers for combining the outputs of the two multipliers to produce a detected signal whereby certain components of the multiplier outputs are cancelled so that the detected signal of the summing means more closely resembles said data signal than does the output of either of the two multipliers, wherein the detecting signals are generated by a variable frequency oscillator, control means for producing a third signal including means for separately detecting the received signal with the output of the oscillator and a fourth signal phase shifted by 90° with respect to the output of the oscillator, said control means further including adding means for adding the third and fourth signals, said control means being connected to the oscillator to maintain the output of the oscillator locked at a constant phase relationship with the carrier component of the received signal.

2. A transmission system for digital data, comprising: a transmitter including means for generating a carrier wave and an amplitude modulator adapted to receive said data signal and the output of the generator and to provide an amplitude modulated output signal consisting of the product of the two; a transmission line connected to receive the output of the modulator; a receiver connected to the transmission line at the end opposite to the transmitter and including supplying first and second detecting signals, a first product multiplier operative to accept as inputs the output of the transmission line and a first detecting signal having a frequency equal to that of said carrier and a fixed phase relationship with respect to the carrier component of the output of the transmission line, a second multiplier operative to accept as inputs the outputs of the transmission line and a second detecting signal having an orthogonal relationship to said first detecting signal, and summing means connected with the two multipliers for combining the outputs of the two multipliers to produce a detected signal whereby certain components of the outputs are cancelled so that the detected signal more closely resembles said data signal than does the output of either of the two multipliers, wherein said receiver includes a differentiator connected to the output of one of the product multipliers whereby said output is differentiated before being combined with the output of the other product multiplier.

3. The transmission system of claim 2 wherein the two detecting signals have sinusoidal wave forms of the same frequency as the carrier, one detecting signal has the same phase as the carrier component of the received signal and the other detecting signal has a phase shifted by 90° with respect to that of the first, said differentiator being connected to the output of the product multiplier which receives the 90° phase-shifted detecting signal and is thereby differentiated before being combined with the output of the other product modulator.

4. The transmission system of claim 2 wherein said means supplying first and second detecting signals includes phase shift means operative on one of the detecting signals to phase shift it 45° in a leading direction with respect to the carrier of the received signal of the output of the transmission line and operative on the other detecting signal to phase shift it 45° in a lagging direction with respect to the carrier component of the output of the transmission line.

UNITED STATES PATENT OFFICE
CERTIFICATE OF CORRECTION

Patent No. 3,611,144 Dated October 5, 1971

Inventor(s) Samuel T. Harmon, Jr.

It is certified that error appears in the above-identified patent and that said Letters Patent are hereby corrected as shown below:

Column 1, line 6 after "electrical" delete "3000" and insert --and--. Column 3, line 2 "end" should be --and--. Column 4, line 1 "And" should be --Any--; line 4 "lcoal" should be --local--; line 26 after "data" delete "data"; line 34 "produce" should be --product--; line 42 "R=S-S'-S''+S'''+S''''= . . . (1)" should be --R=S-$\hat{S}$'-S''+$\hat{S}$'''+S''''+ . . . (1)--; line 47 "S" should be --$\hat{S}$--; line 52 "Q=S+S'-S'''-S''''+ . . . (2)" should be --Q=$\hat{S}$+S'-$\hat{S}$'''-S''''+ . . . (2)--; line 57 "Q'=S'+S''-S'''-S'''' . . . (3)" should be --Q'=$\hat{S}$'+S''-$\hat{S}$'''-S'''' + . . . (3)--; line 65 "R+Q'S" should be --R+Q'=S--. Column 5, line 2 "double i side-band" should be --double-side-band--.

Signed and sealed this 2nd day of May 1972.

(SEAL)
Attest:

EDWARD M.FLETCHER, JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334